UNITED STATES PATENT OFFICE.

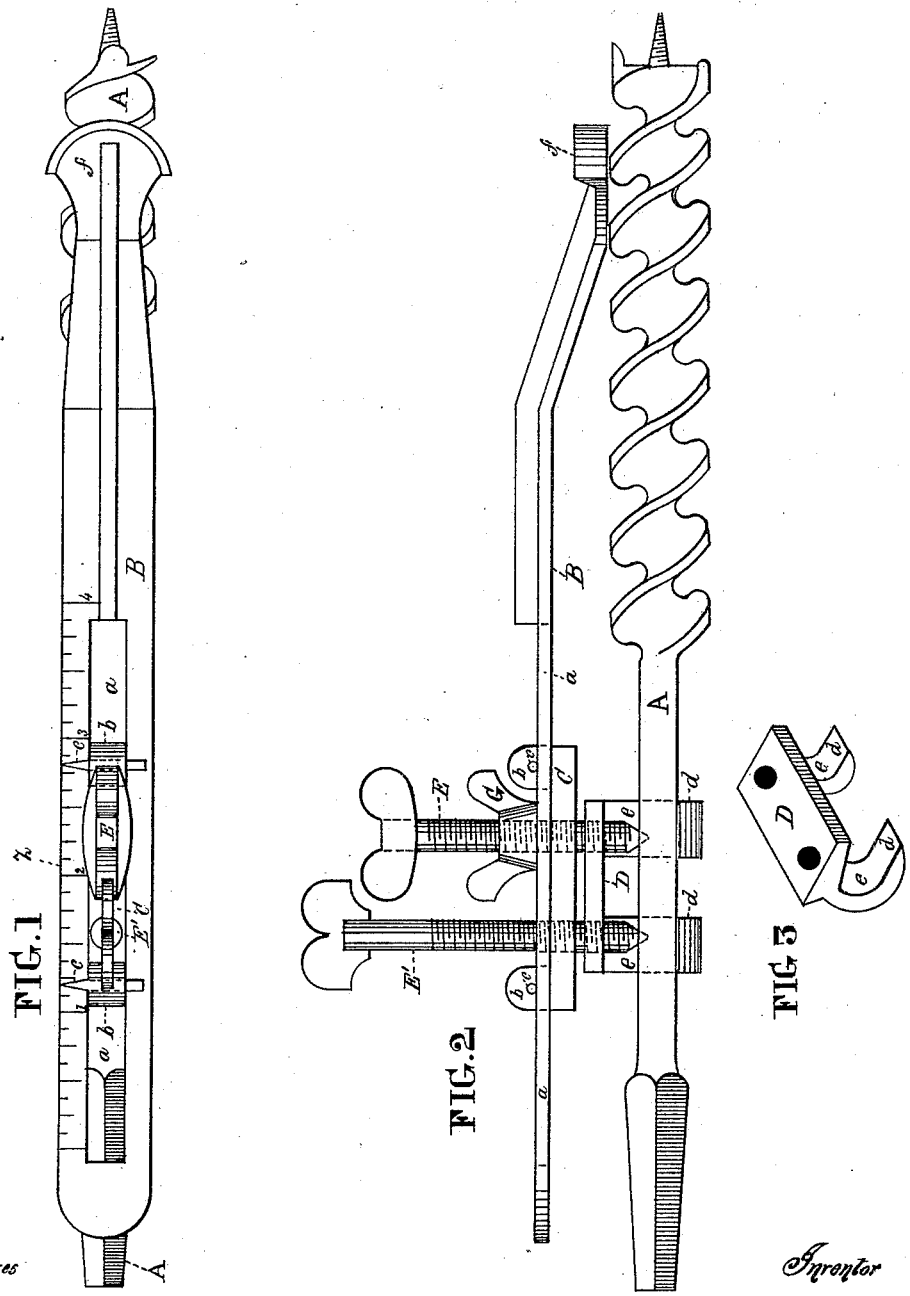

WILLIAM F. RUTTER, OF ATLANTIC CITY, NEW JERSEY.

BORING-BIT GAGE.

SPECIFICATION forming part of Letters Patent No. 232,851, dated October 5, 1880.

Application filed February 7, 1880.

*To all whom it may concern:*

Be it known that I, WILLIAM F. RUTTER, a citizen of the United States, residing at Atlantic City, in Atlantic county, and State of New Jersey, have invented a new and useful Improvement in Boring-Bit Gages, of which the following is a specification.

My invention consists of an adjustable gage-bar having a foot adapted to bear upon the surface of the wood to be bored to arrest the action of the boring-bit when the hole has been bored to the requisite depth, in combination with the bit and clamp for connecting the gage-bar with the bit and an index-slide and set and confining screws, the said bar having a longitudinal slot, with which lugs of the index-slide are connected, whereby the quick and accurate adjustment of the gage is effected, as hereinafter fully described.

In the accompanying drawings, which make a part of this specification, Figure 1 is a face view of the gage-bar B, in connection with the brace-bit A and index-slide C. Fig. 2 is an edge view of the bar B, slide C, and clamp D, in connection with the bit A. Fig. 3 is an isometrical view of the clamp D.

Like letters of reference in all the figures indicate the same parts.

A represents a brace-bit; B, the gage-bar; C, an index-slide, and D a clamp for confining the whole, in connection with the bit, in the adjusted position of the bar by means of the screws E and E'. The bar B has a longitudinal slot, $a$, which receives the lugs $b\ b$ of the slide C. The said lugs have index-points $c\ c$, so that the bar may be adjusted with them, pointing to the figure or fractional part of the scale Z, to indicate the depth of the hole or holes to be bored. The clamp D has projections $d\ d$, which form openings $e\ e$ to receive the shank of the bit A. The screws E E' pass through the slot $a$ of the bar B and threaded holes of the slide C and like holes in the clamp D, their points entering countersink-holes in the shank to hold the clamp in its proper position upon the bit. The foot $f$ of the bar B is projected toward the side of the bit, as seen in Fig. 2, so as to be brought to nearly or quite touch it, the adjustment in this direction being regulated by means of the nut G on the screw E, and the adjustment of the latter in the slide C by screwing it farther through the slide or unscrewing it outward from it, as may be required, and the screw E' being regulated by unscrewing for said adjustment, and afterward screwing it up to hold the parts firmly in their adjusted position.

I claim as my invention—

1. The gage-bar B, having a longitudinal slot, $a$, and foot $f$, in combination with the bit A, clamp D, having slotted projections $d\ d$ to receive the shank of the bit, index-slide C, having lugs $d\ d$, adapted to fit and slide in the slot $a$ of the bar B, and the screws E and E', the former having a nut, G, the screws passing through the longitudinal slot $a$ of the bar and threaded holes of the slide C and clamp D, whereby to confine the bar, clamp, slide, and bit securely together in the adjusted position of the bar B, substantially as and for the purpose set forth.

2. The slide C, having lugs $b\ b$, provided with index-points $c$, in combination with the gage-bar B, having a slot, $a$, to receive the lugs $b\ b$, and a foot, $f$, the clamp D, and set-screws E and E', so arranged that the slide, gage-bar, and clamp are connected by the screws E and E', substantially as set forth.

WILLIAM F. RUTTER.

Witnesses:
THOMAS J. BEWLEY,
STEPHEN USTICK.